United States Patent Office 3,641,061
Patented Feb. 8, 1972

---

3,641,061
SUBSTITUTED MERCURI CYCLOHEXYL COMPOUNDS
Roger P. Napier, Bridgewater, N.J., and Michael P. Pirnik, Boston, Mass., assignors to Mobil Oil Corporation
No Drawing. Filed Apr. 21, 1969, Ser. No. 818,077
Int. Cl. C07d 13/00; C07f 3/10
U.S. Cl. 260—340.9                 6 Claims

---

ABSTRACT OF THE DISCLOSURE

Cyclohexanones and ketals thereof having mercuri substituents in the 2-position and hydroxy, alkoxy, or acetoxy in the 3-position are effective fungicides and bactericides.

BACKGROUND OF THE INVENTION

Field of the invention

The invention is concerned with novel mercury-containing cyclohexanone compounds and their use as bactericides and fungicides.

Description of the prior art

As is well known to those familiar with the art, phenyl mercury compounds, such as phenylmercuri acetate, have been proposed as fungicides, bactericides and slimicides. Insofar as is now known, the cyclohexanone compounds of this invention are new compounds, and, hence, are not known to have fungicidal and bactericidal properties.

Summary of the invention

The present invention provides cyclohexanone compounds having the structure:

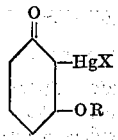

wherein X is Cl, F, or acetoxy and R is H, alkyl ($C_1$–$C_3$), or acetyl; and the ethylene ketals thereof.

DESCRIPTION OF SPECIFIC EMBODIMENTS

Typical fungicidal and bactericidal compounds of this invention are 2-acetoxymercuri-3-methoxycyclohexanone,
2-acetoxy-mercuri-3-propoxycyclohexanone,
2-acetoxymercuri-3-acetoxycyclohexanone,
2-acetoxymercuri-3-hydroxycyclohexanone,
2-chloromercuri-3-methoxycyclohexanone,
2-chloromercuri-3-hydroxycyclohexanone,
2-chloromercuri-3-acetoxycyclohexanone,
2-fluoromercuri-3-ethoxycyclohexanone,
2-fluoromercuri-3-hydroxycyclohexanone,
2-fluoromercuri-3-acetoxycyclohexanone, and the ethylene ketals of the foregoing compounds.

The compounds of this invention are prepared by reactions that can be carried out easily at ambient temperatures. The acetoxymercuri-substituted compounds are prepared by reacting 2-cyclohexen-1-one with mercuriacetate in a solvent having a hydroxyl group, i.e., water, an alcohol, or acetic acid. It is the type of solvent that determines the —OR substitutent in the 3-position. Thus, water produces a hydroxy substituent, an alkyl produces methoxy, ethoxy, or propoxy substituents, and acetic acid introduces an acetoxy substituent.

The chloromercuri (or fluoromercuri) compounds are prepared by reacting acetoxymercuri-substituted compounds with an aqceous solution of sodium chloride (or sodium fluoride). The ethylene ketal is prepared by reacting ethylene glycol with the ketone group in the presence of an acid catalyst, such as p-toluenesulfonic acid. As water is produced, it is preferable to use a non-polar solvent, such as benzene, toluene, or xylene, and remove the water by azeotropic distillation.

Compounds of this invention and the methods and techniques of preparing them are demonstrated in the following examples.

EXAMPLE 1

2-acetoxymercuri-3-methoxycyclohexanone

Mercuric acetate (3.19 g., 0.01 mole) was slurried in 10 ml. of methanol. To this was added 0.96 g. (0.01 mole) of 2-cyclohexen-1-one and the mixture was stirred for 45 minutes. During this time, a solution was formed. The solvent was removed by evaporation to afford a quantitative yield of oily product.

EXAMPLE 2

2-chloromercuri-3-methoxycyclohexanone

Mercuric acetate (3.19 g., 0.01 mole) was slurried in 10 ml. of methanol. To this was added 0.96 g. (0.01 mole) of 2-cyclohexen-1-one and the mixture was stirred for 45 minutes. During this time, a solution was formed. The solution was then added dropwise to a solution of 0.6 g. (0.01 mole) of sodium chloride in 100 ml. of water. A quantitative yield of product precipitated. It was removed by filtration and air dried. The melting point was 171–2° C. and molecular weight was 363 (mass spectrum).

EXAMPLE 3

2-chloromercuri-3-acetoxycyclohexanone

Mercuric acetate (3.19 g., 0.01 mole) was slurried in 10 ml. of acetic acid. To this was added 0.96 g. (0.01 mole) of 2-cyclohexen-1-one and the mixture was stirred until a solution was obtained (ca. 0.5 hour). This acetic acid solution was then added dropwise to a solution of 0.6 g. (0.01 mole) of sodium chloride in 100 ml. of water. The product precipitated in quantitative yield.

EXAMPLE 4

2-chloromercuri-3-hydroxycyclohexanone

The procedure of Example 3 was repeated, except that water was used as the initial solvent in place of acetic acid. The product has a melting point of 141–5° C.

EXAMPLE 5

Ethylene ketal of 2-chloromercuri-3-methoxycyclohexanone

Mercuric acetate (3.19 g., 0.01 mole) was slurried in 10 ml. of methanol. To this was added 1.4 g. (0.01 mole) of 2-cyclohexen-1-one ethylene ketal. The mixture became a solution as this olefinic compound was added. After stirring for ten minutes, this solution was added dropwise to a solution of 0.6 g. (0.01 mole) of sodium chloride in 100 ml. of water. An insoluble white paste formed, which was taken up in tetrahydrofuran. This solution was dried over magnesium sulfate, filtered, and stripped of solvent to yield 2.6 g. of an oily product.

Calculated for $C_9H_{12}HgClO_3$ (percent): C, 26.54; H, 3.69. Found (percent): C, 26.68; H, 3.99.

The compounds of this invention have been found to be effective agricultural fungicides and bactericides. The cyclohexanone compounds contemplated herein are applied as the toxic components in fungicidal and bactericidal compositions of at least one such compound, and a carrier. In order to achieve a broader spectrum of control, it is within the contemplation of this invention to include two or more cyclohexanone derivatives in the bactericidal composition.

The compositions can be applied as dusts, as liquid sprays or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the bactericidal compositions. Non-limiting examples of liquid carriers include water; organic solvents, such as alcohols, ketones, amides, and esters; mineral oils such as kerosene, light oils, medium oils; and vegetable oils such as cottonseed oil. Non-limiting examples of solid carriers include talc, bentonite, diatomaceous earth, pyrophyllite, fuller's earth, gypsum, flours derived from the cotton seeds and nut shells, and various natural and synthetic clays having a pH not exceeding about 9.5.

The amount of the contemplated cyclohexanone derivatives used in the fungicidal and bactericidal compositions will vary rather widely, it depends to some extent upon the type of composition in which the material is being used, the nature of the condition to be controlled, and the method of application. In the ultimate fungicidal and bactericidal composition, as applied in the field, concentrations as low as 0.0001 weight percent of the total composition can be used. In general, compositions, as applied, containing about 0.005-0.01 weight percent (50-100 p.p.m.) bactericide in either liquid or solid carrier, give good results. In some cases, however, stronger dosages up to about one weight percent may be required.

In practice, fungicidal and bactericidal compositions are usually prepared in the form of concentrates, which are diluted in the field to the concentration desired for application. For example, the concentrate can be a wettable powder containing large amounts of fungicide-bactericide, a carrier (e.g., attapulgite or other clay), and wetting and dispersing agents. Such powders can be diluted prior to application by dispersing it in water to obtain a sprayable suspension containing the concentration of fungicide-bactericide desired for application. Other concentrates can be solutions that can be later diluted, e.g., with kerosene. Thus, it is within the contemplation of this invention to provide fungicidal and bactericidal compositions containing up to about 80 percent, by weight, of the composition, or fungicide-bactericide. Accordingly, depending upon whether it is ready for application, or it is in concentrated form, the contemplated fungicidal and bactericidal compositions contain between about 0.0001 percent and about 80 percent, by weight, of the composition of at least one cyclohexanone derivative and a carrier, liquid or solid, as defined hereinbefore.

The bactericides are tested for effectiveness against plant bacteria by the following procedure:

CONTACT SCREENING METHODS

Penicillin disc test (Primary)

Method of culturing the test organism.—*Xanthomonas vesicatoria*, the casual organism of bacterial Leaf Spot of Pepper, is cultured on nutrient agar in 20 x 150 mm. test tubes. The medium is prepared by dissolving 23 grams of nutrient agar in 1000 ml. of cold distilled water, heating to boiling to completely dissolve the agar, and sterilizing in the autoclave for 15 minutes at 15 pounds pressure and 121° C. Ten ml. of the medium is poured in each test tube, allowed to solidify and then streaked with the bacterium from a pure culture. Cultures are optimum for use in tests after seven days.

Method of treatment.—A seven-day old culture of *X. vesicatoria* is washed from a test tube with sterile water and added to 500 ml. of nutrient agar when the medium reaches a temperature of 50° C. Forty ml. of innoculated medium is added immediately to each 90 mm. petri dish and allowed to solidify. A 100 p.p.m. solution of the compound is prepared by dissolving the compound in a suitable solvent and diluting with water to a 100 ml. volume. With sterile forceps, two sterile penicillin assay disc (12 mm. diameter) are dipped into each solution, tapped gently to remove excess solution and planted on top of the medium surface. Each disc is pressed gently on the medium to seat it firmly. Plates are covered and incubated at 26° C. for seven days.

Method for recording results.—After seven days, ratings are made by measuring the diameter of the zone of inhibition surrounding the disc according to the following key:

Key to penicillin disc test

| Rating: | Diameter of zone of growth inhibition (mm.) |
|---|---|
| 1 | 0 |
| 2 | 0–6 |
| 3 | 9 |
| 4 | 12 |
| 5 | 15 |
| 6 | 18 |
| 7 | 21 |
| 8 | 24 |
| 9 | 27 |
| 10 | or more.[1] |

[1] Streptomycin sulfate gives this rating after 7 days at 100 p.p.m.

The compounds of Examples 1 through 5 were subjected to the aforedescribed test. Test results are:

|  | Example | | | |
|---|---|---|---|---|
|  | 1 | 3 | 4 | 5 |
| Concentration, p.p.m.: | | | | |
| 100 | 10 | 10 | 10 | 8 |
| 50 | | 8 | 9 | 7 |
| 10 | | 1 | 5 | 0 |

FUNGICIDE SCREENING METHODS

Contact screening method (A) Depression Slide (Spore Germination) Test.—Compounds are screened at 50 p.p.m. against *Monilinia fructicola* and *Stemphylium sarcinaeforme* and if desired are screened at 10 p.p.m. against all five organisms shown below.

Method of culturing the test organisms.—Fungus species *Monilinia fructicola*, *Stemphylium sarcinaeforme*, *Alternaria oleracea*, *Phytophthora capsici* and *Puccinia graminis tritici* are cultured on potato dextrose agar, oat agar, potato dextrose agar, malt agar, and wheat plants, respectively, at room temperature under continuous fluorescent light. Spores growing in 90 mm. petri dishes containing 40 ml. of the respective agar medium or on the wheat host (for *P. graminis tritici*) are ready for the test after one week.

Method of treatment.—Spores are obtained by scraping them from the surface of the cultures with a rubber policemen or bacterial loop and washing them free with distilled water. The spores in suspension are filtered through a thin layer of glass wool to remove bits of mycelium, and freed of soluble extraneous materials by centrifuging and resuspending the distilled water. The spore concentration is adjusted to 10,000 per ml., using a Fuchs-Rosenthal counting chamber.

Washing spores (as described above) eliminates water-soluble agents which might affect germination. However, washed spores of some fungi will not germinate readily in distilled water. A spore germination stimulant of ultra filtered orange juice is prepared by filtering fresh orange juice through cheesecloth and then through fine filter paper. The filtrate is diluted with distilled water to give a 10 percent solution. Five ml. portions are placed in twodram, screw-capped vials and stored in the freezer until needed. When needed, the 10 percent solution is again diluted 1:9 and added to the spore solution in equal amounts, giving a stimulant concentration of 0.5 percent.

One hundred mg. of each test compound is weighed into a four-dram, wide-mouth vial and dissolved in 10 ml. of a volatile solvent (usually acetone) giving a 10,000 p.p.m. concentration. A 50 p.p.m. concentration is prepared by serial dilution.

Two-tenths ml. of the 50 p.p.m. solution is placed in the well of a hollow-ground depression slide. One slide is prepared for each fungus organism. The volatile solvent is allowed to evaporate (15 minutes for acetone) leaving a deposit of the toxicant. Two-tenths ml. of the spore suspension-stimulant mixture is then added to each slide. Slides are placed in large, inverted glass moisture chambers on metal holding racks and the chambers are sealed with water to maintain a high relative humidity of near 100 percent. Chambers are held at constant room temperature near 24° C.

Method for recording results.—After sixteen days, results are taken by counting the number of spores germinating per 50 spores from each of the two slides treated with the compound. The number failing to germinate is recorded as percent spore germination inhibition.

Soil screening method (A) Paper Cup Drench Method (Primary): Method of culturing test organisms.—Four representative soil fungi *Fusarium oxysporium*, *Pythium debaryanum*, *Rhizoctonia solani* and *Sclerotium rolfsii* are maintained on potato dextrose agar, in 20 x 150 mm. test tubes. Inoculum for the tests is increased in 1000 ml. Erlenmeyer flask on a ¼ corn meal-¾ sand mixture (by volume). The medium is saturated with water and sterilized by autoclaving at 15 pounds pressure for 20 minutes, on two successive days. The medium is innoculated by transferring, aseptically a small amount of mycelium for the test tube cultures fourteen days prior to using the innoculum.

Method of treatment (50 p.p.m. based on the weight of the soil).—An innoculated medium for each of the four soil organisms is prepared as follows: A fourteen-day old 1000 ml. flask of the corn meal-sand innoculum is used to innoculate twenty ten-oz. cups of sterile soil by blending the innoculum and sterile sand for 10 minutes.

The innoculated medium is then placed in 10 oz. wax treated cold drink cups (20 cups of each organism) and treated as follows: A 150 mg. quantity of each candidate fungicide is weighed on the analytical balance and formulated using 10 ml. of acetone and 190 ml. of $H_2O$. A 50 ml. quantity of each chemical formulation is used to drench, one cup innoculated with each of the four fungal organisms. Immediately after the cups are drenched, they are placed in polyethylene bags (one cup per bag) and held at 70° F. for fourteen days.

Method of recording results.—After ten days, each cup is examined for the presence of fungal growth and each compound is rated for the percent inhibition of fungal growth.

Mercuricyclohexanone derivatives falling within the scope of those contemplated in this invention were tested by the aforedescribed procedures. The test results (percent effectiveness) are set forth in the following table. In the table, the following abbreviations are used to identify the fungi species used.

FO:*Fusarium oxysporium*
PD:*Pythium debaryanum*
RS:*Rhizoctonia solani*
SR:*Sclerotium rolfsii*
MF:*Monilinia fructicola*
SS:*Stemphylium sarcinaeforme*
AO:*Alternaria oleracea*
PG:*Puccinia graminis*
PC:*Phytophthora capsici*

TABLE

| Fungus | P.p.m. | Example 1 | Example 3 | Example 4 | Example 5 |
|---|---|---|---|---|---|
| MF | 50 | 100 | 100 | 100 | 100 |
|    | 10 | 100 | 100 | 100 | 100 |
|    | 1  |     | 100 | 100 | 100 |
| SS | 50 | 100 | 100 | 100 | 100 |
|    | 10 | 100 | 100 | 100 | 100 |
|    | 1  |     | 0   | 0   | 0   |
| AO | 50 |     |     |     |     |
|    | 10 |     |     |     |     |
|    | 1  |     |     |     |     |
| PC | 50 |     |     |     |     |
|    | 10 |     | 100 | 100 | 100 |
|    | 1  |     | 0   | 0   | 0   |
| PG | 50 |     |     |     |     |
|    | 10 |     |     |     |     |
|    | 1  |     |     |     |     |
| FO | 50 |     | 0   | 70  | 100 |
| PD | 50 |     | 0   | 70  | 100 |
| RS | 50 |     | 0   | 70  | 100 |
| SR | 50 |     | 70  | 70  | 100 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. Ketone compounds having the structure:

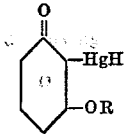

wherein X is Cl, F, or acetoxy and R is H, alkyl ($C_1$–$C_3$) or acetyl.

2. A ketone compounds of claim 1, wherein X is acetoxy and R is methyl.

3. A ketone compound of claim 1, wherein X is chloro and R is methyl.

4. A ketone compound of claim 1, wherein X is chloro and R is acetyl.

5. A ketone compound of claim 1, wherein X is chloro and R is hydrogen.

6. The ethylene ketal of the compound of claim 1, wherein X is chloro and R is methyl.

References Cited

UNITED STATES PATENTS 2,090,927   8/1937   Andersen _____ 260—431 UX
2,675,400   4/1954   Howard, Jr. _____ 260—431

FOREIGN PATENTS 974,709   11/1964   Great Britain _____ 260—431

TOBIAS E. LEVOW, Primary Examiner

H. M. S. SNEED, Assistant Examiner

U.S. Cl. X.R.

260—431; 424—278, 291

UNITED STATES PATENT OFFICE
CERTIFICATE OF CORRECTION

Patent No. 3,641,061    Dated February 8, 1972

Inventor(s) Roger P. Napier and Michael P. Pirnik

It is certified that error appears in the above-identified patent and that said Letters Patent are hereby corrected as shown below:

Column 4, line #29, "---or more.$^1$" should be -- ---30 or more$^1$--

Column 6, approximately line 35-38 " 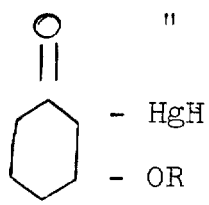 " should be --  --

Column 6, line 45, "compounds" should be -- compound --

Signed and sealed this 5th day of September 1972.

(SEAL)
Attest:

EDWARD M.FLETCHER,JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,641,061      Dated February 8, 1972

Inventor(s) Roger P. Napier and Michael P. Pirnik

It is certified that error appears in the above-identified patent and that said Letters Patent are hereby corrected as shown below:

Col. (1) (Front Page)    Line 4    "Napler" should be --Napier--

Signed and sealed this 6th day of March 1973.

(SEAL)
Attest:

EDWARD M. FLETCHER, JR.
Attesting Officer

ROBERT GOTTSCHALK
Commissioner of Patents